Jan. 24, 1939. G. E. RAYMOND 2,144,896
GATE
Filed Oct. 27, 1937 2 Sheets-Sheet 1
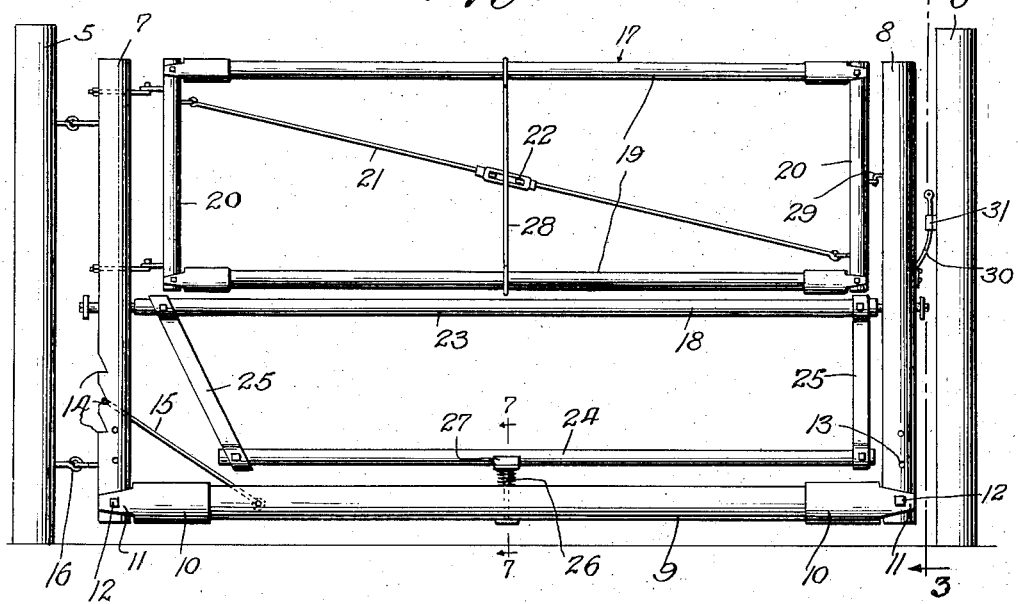
Fig.1.
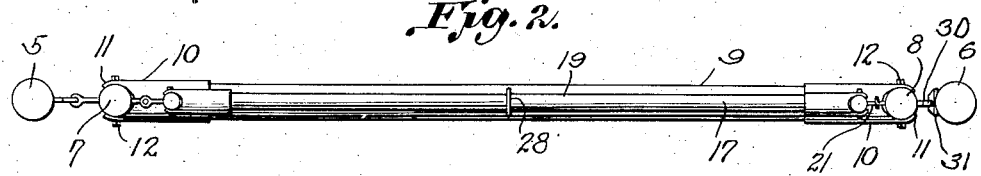
Fig.2.
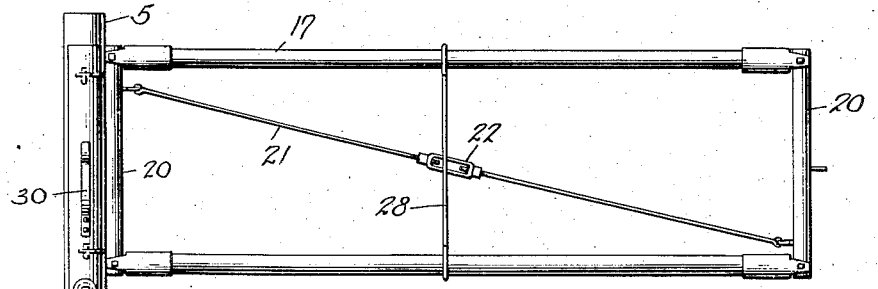
Fig.3.
George E. Raymond,
INVENTOR.
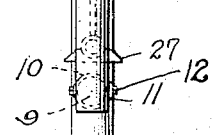
ATTORNEYS.

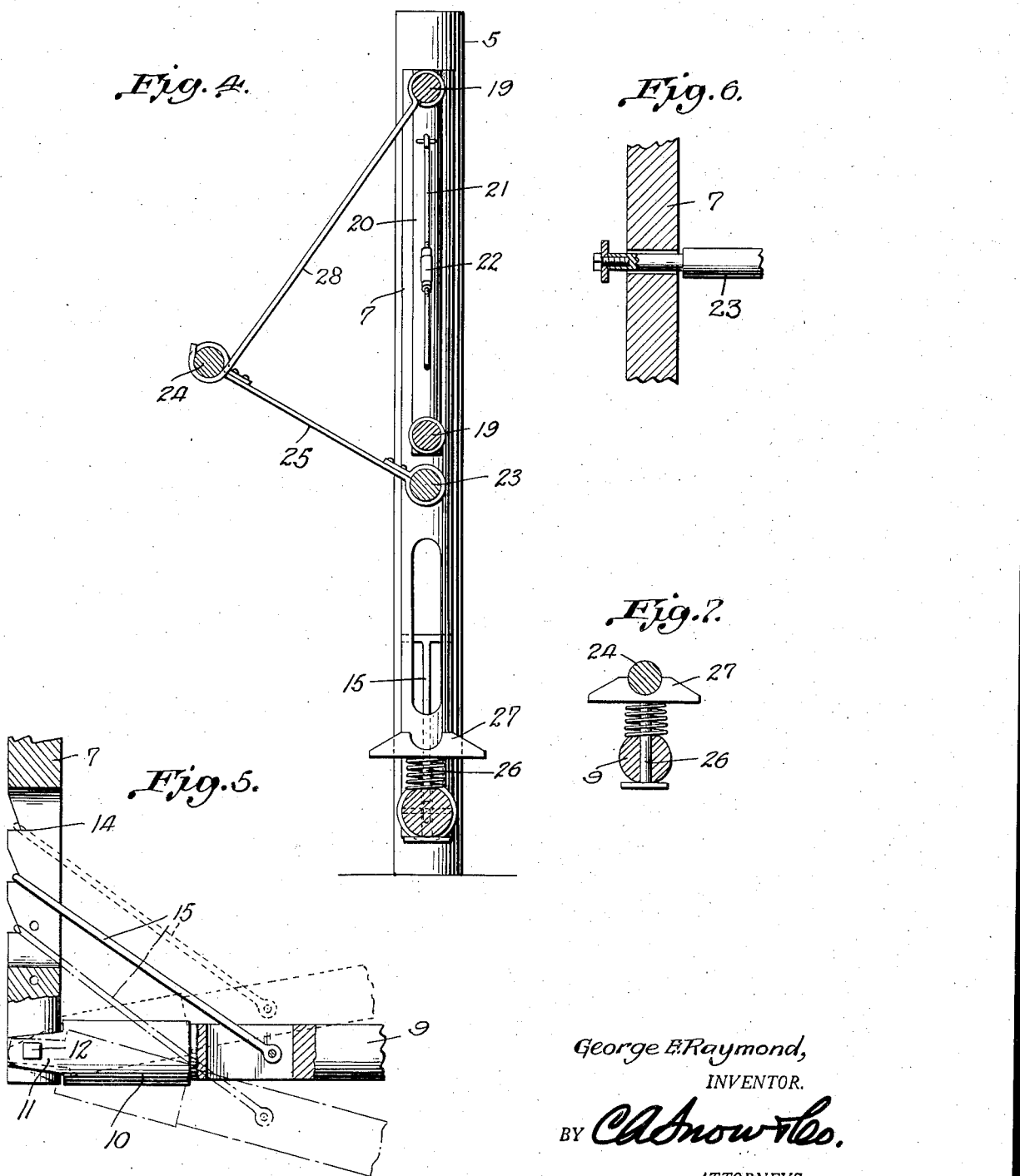

Patented Jan. 24, 1939

2,144,896

UNITED STATES PATENT OFFICE 2,144,896

GATE

George E. Raymond, Madelia, Minn.

Application October 27, 1937, Serial No. 171,303

2 Claims. (Cl. 39—75)

This invention relates to gates, and more particularly to farm gates, the primary object of the invention being to provide a gate comprising an upper section and a lower section, the sections being mounted in such a way that the gate may be moved in its entirety, or either section may be operated independently of the other section, to accomplish the purpose of the invention.

Another object of the invention is to provide a sectional gate wherein the upper section may be swung to an open position, the lower section being closed, so that large animals such as horses or cows may pass through the gate, while smaller animals such as hogs and sheep, will be restrained, by the lower gate section.

A still further object of the invention is the provision of a gate wherein the upper gate section may be moved to its closed position restraining large animals, and the lower gate section opened to permit smaller animals to pass therethrough.

Still another object of the invention is to provide a gate embodying pivotally connected sections, together with adjusting means whereby the gate may be adjusted to raise or lower the outer end of the gate, whereby the gate may be used on sloping surfaces, or on the sides of hills.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of a gate constructed in accordance with the invention, the gate being shown in its closed position.

Figure 2 is a plan view of the gate in its closed position.

Figure 3 is an end elevational view of the gate, showing the upper section of the gate as moved to its open position.

Figure 4 is a vertical sectional view through the gate, showing the lower gate section as swung upwardly to its open position.

Figure 5 is a fragmental sectional view, illustrating the adjusting means whereby the free end of the gate may be raised or lowered.

Figure 6 is a sectional view illustrating the connection between the upper horizontal bar of the lower gate section and the vertical bar at one end of the gate.

Figure 7 is a sectional view taken on line 7—7 of Figure 1.

Referring to the drawings in detail, the reference character 5 designates the gate supporting post, and the reference character 6 designates the post to which the usual keeper is secured, whereby the gate is held in its closed position.

The gate embodies a frame comprising vertical end posts 7 and 8, which are connected at their lower ends, by means of the horizontal bar 9. The connection between the posts 7 and 8 and bar 9, embody collars 10 that have spaced fingers 11 that embrace portions of the vertical posts 7 and 8, there being provided bolts 12 passing through the fingers 11 and through the openings 13 formed in the posts 7 and 8, whereby the horizontal bar 9 may be adjusted vertically along the posts 7 and 8.

Notches indicated by the reference character 14 are formed on the post 7, which notches are adapted to accommodate the wire 15, that has its ends connected to the horizontal bar 9, at a point in spaced relation with the post 7. Due to this construction it will be seen that when the wire 15 is moved to engage within the notch 14 above the notch in which the wire is shown as positioned, the outer end of the gate will be elevated, thereby adapting the gate for use on a side hill or wherein the ground surface slopes upwardly.

Should it be desired to use the gate on a downwardly sloping surface, it will be obvious that by moving the wire 15 to the lowermost notch 14, the outer end of the horizontal bar 9 will be permitted to sag in conformity to the contour of the ground surface.

The main frame of the gate is supported by means of the gate hinges 16, which may be of any desirable construction, however in the present showing the gate hinges are of the interlocking eye bolt type.

Supported within the main frame of the gate, is an upper section 17 and a lower section 18, the upper section being substantially wide with respect to the lower section. This upper section 17 is of the horizontal swinging type, while the gate section 18 is mounted in such a way that it will swing upwardly. The upper gate section 17 embodies upper and lower parallel bars 19 connected at their ends by means of the vertical bars 20, the connection between the bars 19 and 20 being of the pivotal type, so that the outer end of the gate may be caused to sag or be elevated, to adapt it for a particular use. The reference character 21 designates a tie rod, which has its ends connected to the bars 20, there being provided a turn buckle 22 connected with the tie rod, whereby the tie rod may be lengthened or shortened, to meet various requirements of use.

The lower section 18, embodies an upper bar 23 which is of a length to extend through the posts 7 and 8, as clearly shown by Figure 1 of the drawings. The connection between the bar 23 and posts 7 and 8, is such as to permit of sliding movement of the bar 23 with respect to the posts 7 and 8. The bar 24 forms a part of the lower gate section, and is disposed in parallel relation with the bar 23, the ends of the bars 23 and 24 being connected by means of the bars 25. Extending upwardly from the bar 9, is a spring-pressed pin 26 that is provided with a head 27 formed with a recessed portion in which the bar 24 of the lower gate section may rest, under normal conditions, the head acting as a keeper, to retain the horizontal bar 24 of the lower gate section, holding the gate section in its closed position. Should it be desired to swing the lower gate section 18 to its open position, or to a position as shown by Figure 4 of the drawings, the spring-pressed pin 26 is formed downwardly, whereupon the head 27 releases the bar 24. The lower gate section may now be swung upwardly, and hooked over the free end of the arm 28 that is connected with the upper bar 19 of the upper gate section.

The upper gate section is normally held in its closed position, by latch 29 that is secured to the bar 8 of the main gate frame.

The main gate frame is normally held in its closed position by means of the spring arm 30 which moves into the keeper 31, extending inwardly from the post 6 as shown by Figure 1.

From the foregoing it will be seen that due to the construction shown and described, the upper gate section 17 may be swung to an open position, whereupon large animals such as horses and cows may step over the lower section and pass from one field to another, while small animals such as pigs, or sheep, will be restricted to the field guarded by the gate.

Should it be desired to exclude the larger animals, but allow the small animals to pass from one field to another, the lower gate section 18 may be swung from its closed position as shown by Figure 1 of the drawings, to the open position as shown by Figure 4.

I claim:

1. A farm gate comprising a main gate frame mounted for horizontal swinging movement, a wide upper gate section mounted for horizontal swinging movement within the frame, said upper gate section comprising spaced horizontal bars and vertical bars pivotally connected therewith, means for adjusting the free end of the gate vertically, and a substantially narrow gate section mounted for vertical swinging movement within the main frame.

2. A farm gate comprising a main swinging gate frame, an upper gate section and a lower gate section mounted in the frame, said lower gate section adapted to swing upwardly within the main frame, a spring pressed pin extending upwardly from the main frame, a head on the upper end of the pin, said head having a recess in which the lower bar of the lower gate section rests, normally holding the lower gate section closed.

GEORGE E. RAYMOND.